United States Patent
Dadam et al.

(10) Patent No.: US 11,441,499 B1
(45) Date of Patent: Sep. 13, 2022

(54) METHODS AND SYSTEMS FOR CONTROLLING IMBALANCE WITH AN EXHAUST TUNING VALVE

(71) Applicant: Ford Global Technologies, LLC, Dearborn, MI (US)

(72) Inventors: Sumanth Reddy Dadam, New Hudson, MI (US); Hani Ayesh, Plymouth, MI (US); Vinod Ravi, Canton, MI (US); Di Zhu, Canton, MI (US); Vivek Kumar, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/443,223

(22) Filed: Jul. 22, 2021

(51) Int. Cl.
| | | |
|---|---|---|
| *F02D 9/04* | (2006.01) | |
| *F02D 41/00* | (2006.01) | |
| *F01N 1/08* | (2006.01) | |
| *F01N 1/02* | (2006.01) | |
| *F01N 1/16* | (2006.01) | |
| *F02B 75/18* | (2006.01) | |
| *F02B 75/22* | (2006.01) | |

(52) U.S. Cl.
CPC ........... *F02D 41/0082* (2013.01); *F02D 9/04* (2013.01); *F01N 1/02* (2013.01); *F01N 1/08* (2013.01); *F01N 1/165* (2013.01); *F01N 2210/04* (2013.01); *F01N 2240/36* (2013.01); *F02B 75/22* (2013.01); *F02B 2075/1832* (2013.01)

(58) Field of Classification Search
CPC ........ F01N 1/163; F01N 1/165; F01N 13/087; F01N 2240/36; F02D 9/06; F02D 41/0082; F02D 41/0085
See application file for complete search history.

(56) References Cited

U.S. PATENT DOCUMENTS

| | | | |
|---|---|---|---|
| 11,002,166 B2 | 5/2021 | Ravi et al. | |
| 2008/0066459 A1* | 3/2008 | O'Neill | ..................... F02D 9/04 60/324 |
| 2008/0276904 A1* | 11/2008 | Surnilla | .............. F02D 41/0082 123/406.45 |
| 2012/0191316 A1* | 7/2012 | Leone | ................. F02D 41/0087 701/70 |
| 2015/0100221 A1 | 4/2015 | Routledge et al. | |
| 2015/0252742 A1* | 9/2015 | Stroh | .................. F02D 41/0002 60/274 |
| 2021/0071555 A1 | 3/2021 | Dadam et al. | |

FOREIGN PATENT DOCUMENTS

| | | |
|---|---|---|
| CN | 112611569 A | 4/2021 |
| DE | 102016220172 A1 | 4/2018 |

\* cited by examiner

*Primary Examiner* — Jonathan R Matthias
(74) *Attorney, Agent, or Firm* — Vincent Mastrogiacomo; McCoy Russell LLP

(57) ABSTRACT

Methods and systems are provided for controlling imbalance with an exhaust tuning valve. In one example, a method may include adjusting a first exhaust tuning valve in response to combustion torque imbalance in a first and second group of cylinders. Additionally or alternatively, the position of the second exhaust tuning valve may be adjusted in response to an imbalance generated by the same group of cylinders.

18 Claims, 7 Drawing Sheets

METHODS AND SYSTEMS FOR CONTROLLING IMBALANCE WITH AN EXHAUST TUNING VALVE

FIELD

The present description relates generally to adjusting the position of independently controlled exhaust valves based on vibration indication.

BACKGROUND/SUMMARY

The combustion process and firing of engine cylinders can introduce noise. In some examples, the combustion process generates acoustic effects through the exhaust system and tailpipe. One approach to dampen engine noise is to use a muffler. However, even with a muffler, undesirable sounds may still be generated, or desirable sound may be insufficiently generated.

Other examples of addressing exhaust noise include active exhaust valve systems. One example approach is shown by Dadam et al. in U.S. patent application Ser. No. 16/565,398. Therein, a characteristic map is triggered based on include longitudinal acceleration, lateral acceleration, yaw rate, throttle position, braking force, pitch angle, roll angle, and steering wheel angle. The characteristic map may define an exhaust flap opening to adjust the exhaust noise to be selectively increased or muffled.

However, the inventors have identified some issues with the approaches described above. For example, some sound and/or vibration generated in the exhaust may be due to sub-firing order vibration, and these sub-firing effects may cause undesirable sounds and/or vibrations, or masking of desirable sounds and/or vibration, particularly among separate tail-pipe outlets of the vehicle, which can lead to customer complaints.

In one example, the issues described above may be addressed by a method for controlling a vehicle with an engine and an active exhaust tuning valve, comprising: generating exhaust from a first and second group of cylinders, the exhaust delivered in first and second exhaust passages to first and second tailpipes, respectively; adjusting a first position of an exhaust tuning valve in the first exhaust passage to reduce an imbalance vibration generated by combustion torque imbalances between the first and second groups of cylinders. In this way, cylinder imbalance can be addressed by differential control of the exhaust valves in separate exhaust passages to smooth the suborder vibrations As one example, in a vehicle with driving behavior classified as quiet, cylinder imbalances can cause sub-firing order disturbances. By differentially adjusting a plurality of exhaust tuning valves upstream of separate tail-pipe outlets, it is possible to reduce the sub-firing order disturbances and provide desirable sound quality. For example, a first group of cylinders having higher torque output coupled primarily with a first tail-pipe outlet, as compared to a second group of cylinders having lower torque output coupled primarily with a second tail-pipe outlet, can be identified. In response, a tuning valve coupled upstream of the first tail-pipe outlet, but not the second tail-pipe outlet, can then be moved to a more closed position, even if the torque imbalance remains among the first and second groups of cylinders. If and when the torque imbalance subsides, the valves may be returned to a common position with each valve at the same position.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for controlling a vehicle with an engine and a plurality of active exhaust tuning valves. In an example, a first and second active exhaust tuning valve may be arranged in first and second exhaust passages primarily coupled to different cylinder groups, such as the dual bank exhaust system shown in FIG. 1. An engine controller may be configured to perform control routines, such as the example routine of FIGS. 2, 5, and 6, to adjust operating conditions, including exhaust valve openings, based on a drive mode.

Figure 2:
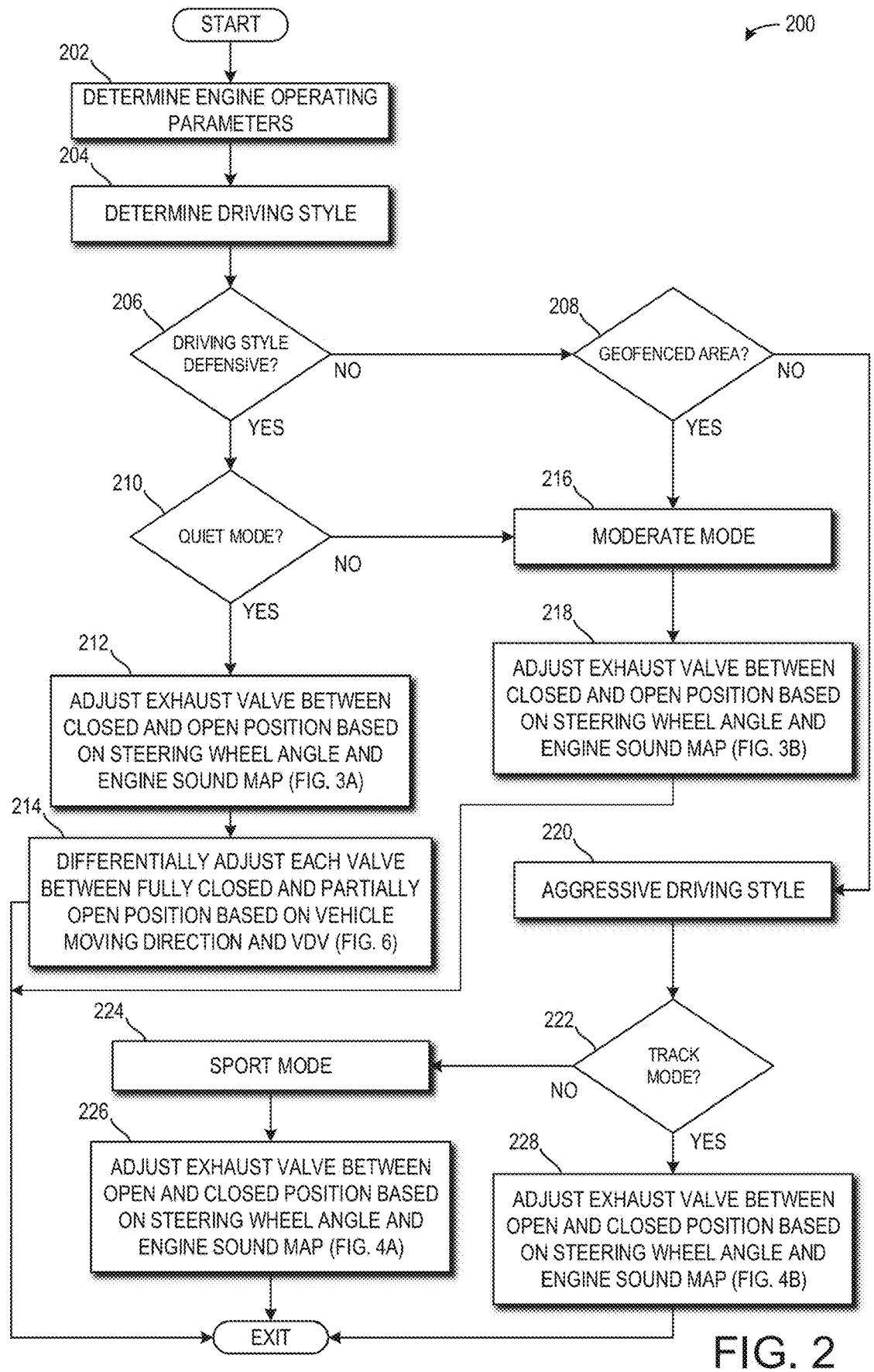
FIG. 2 illustrates a method for classifying driving behavior for selecting a characteristic sound map and selectively adjusting at least first and second exhaust tuning valves.
Figure 3A:
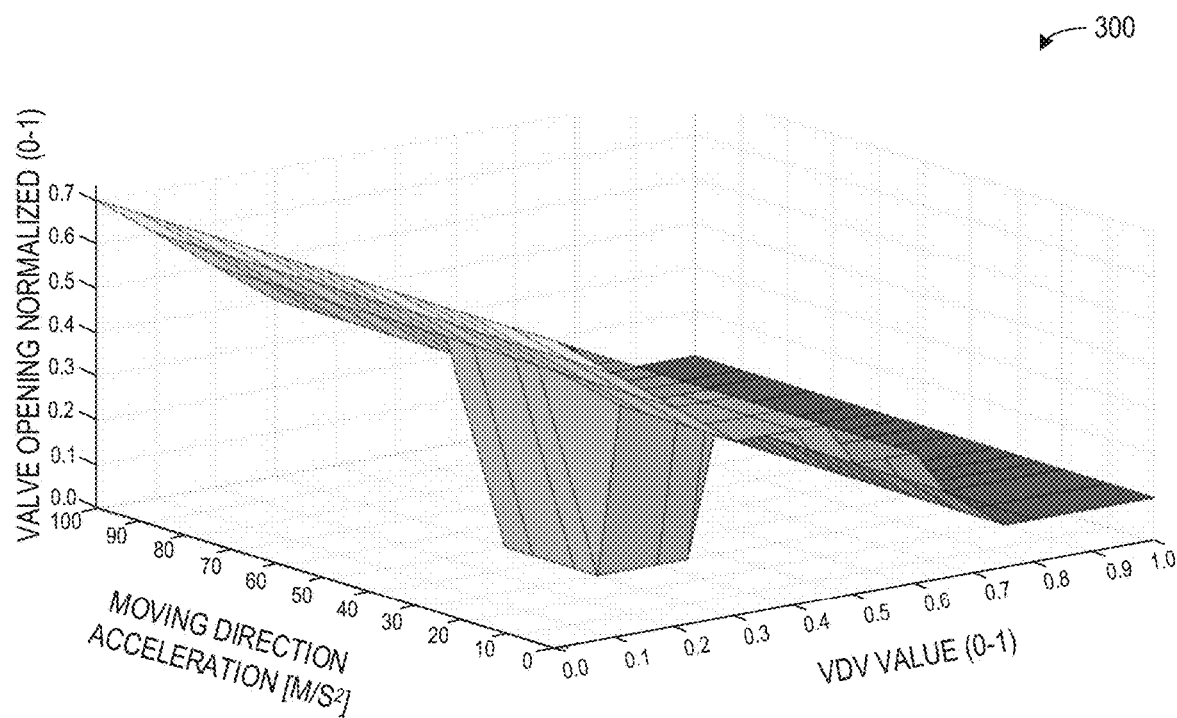
FIGS. 3A and 3B illustrate sound maps for defensive driving styles.
Figure 3B:
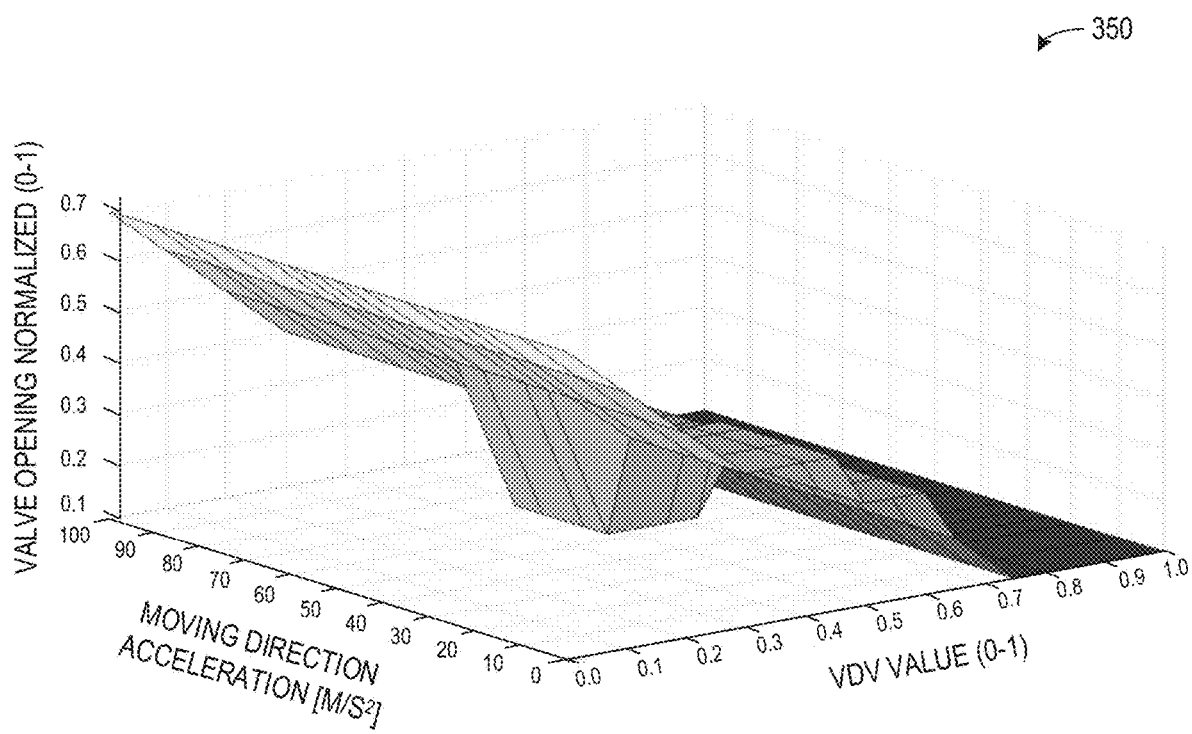
Figure 4A:
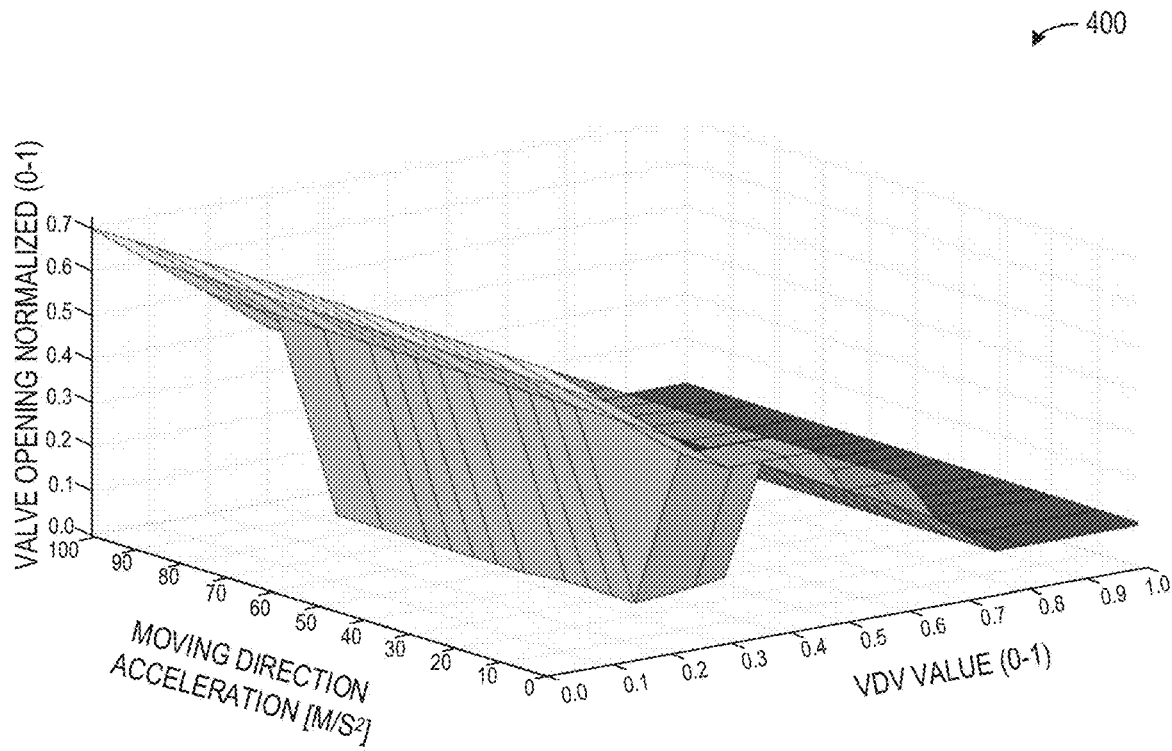
FIGS. 4A and 4B illustrate sound maps for aggressive driving styles.
Figure 4B:
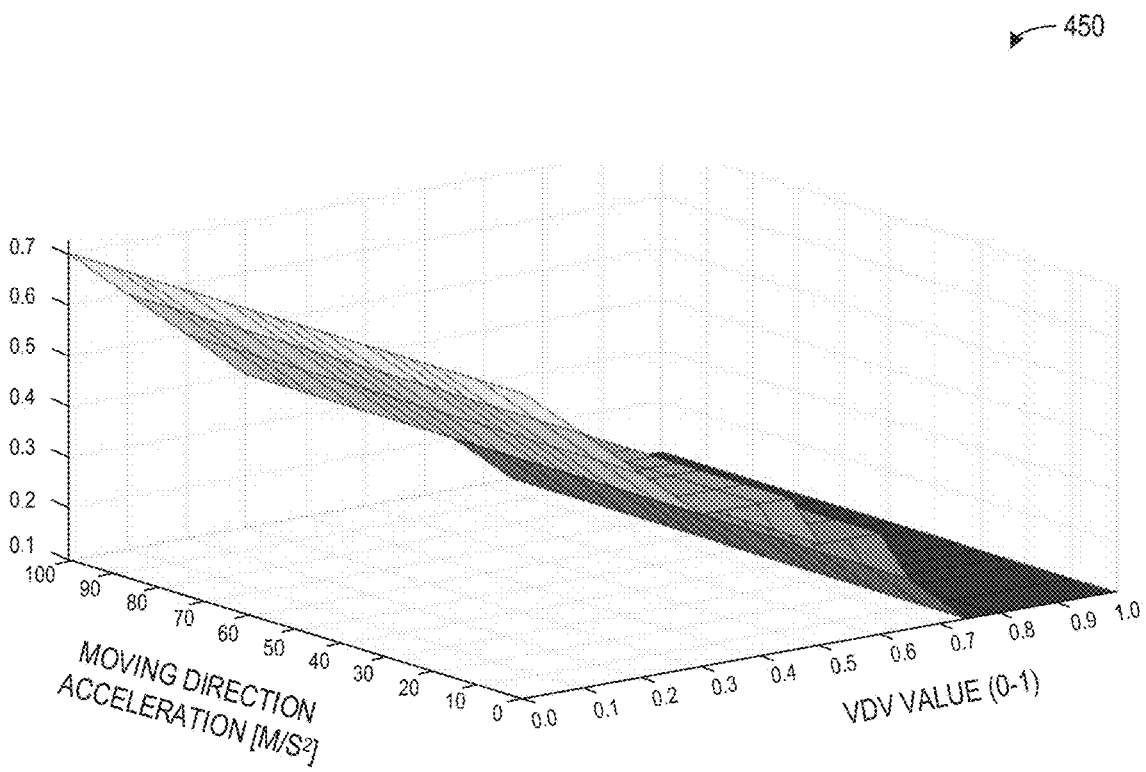
Figure 5:
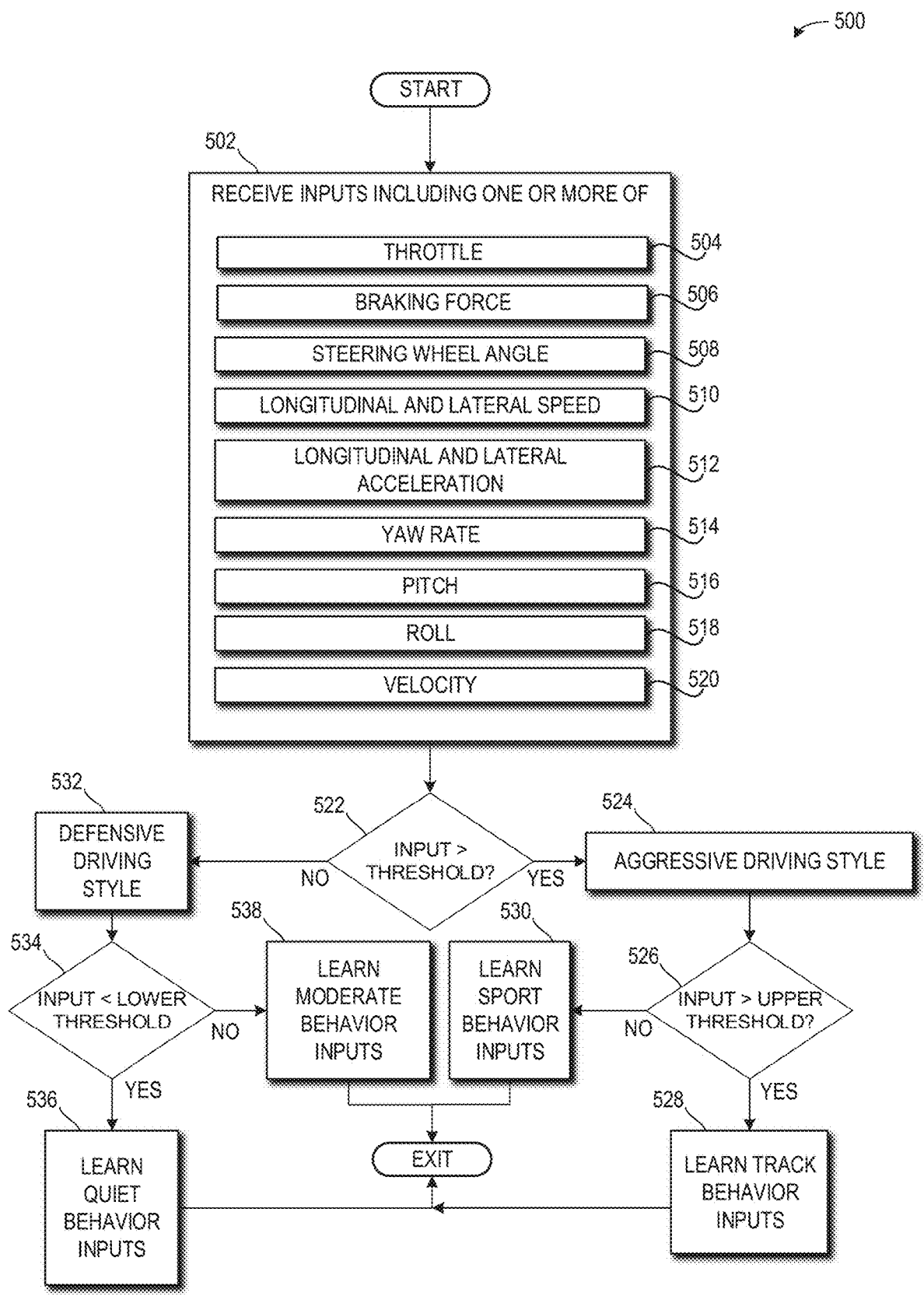
FIG. 5 illustrates a method for receiving a plurality of inputs and determining a current driving behavior.
Figure 6:
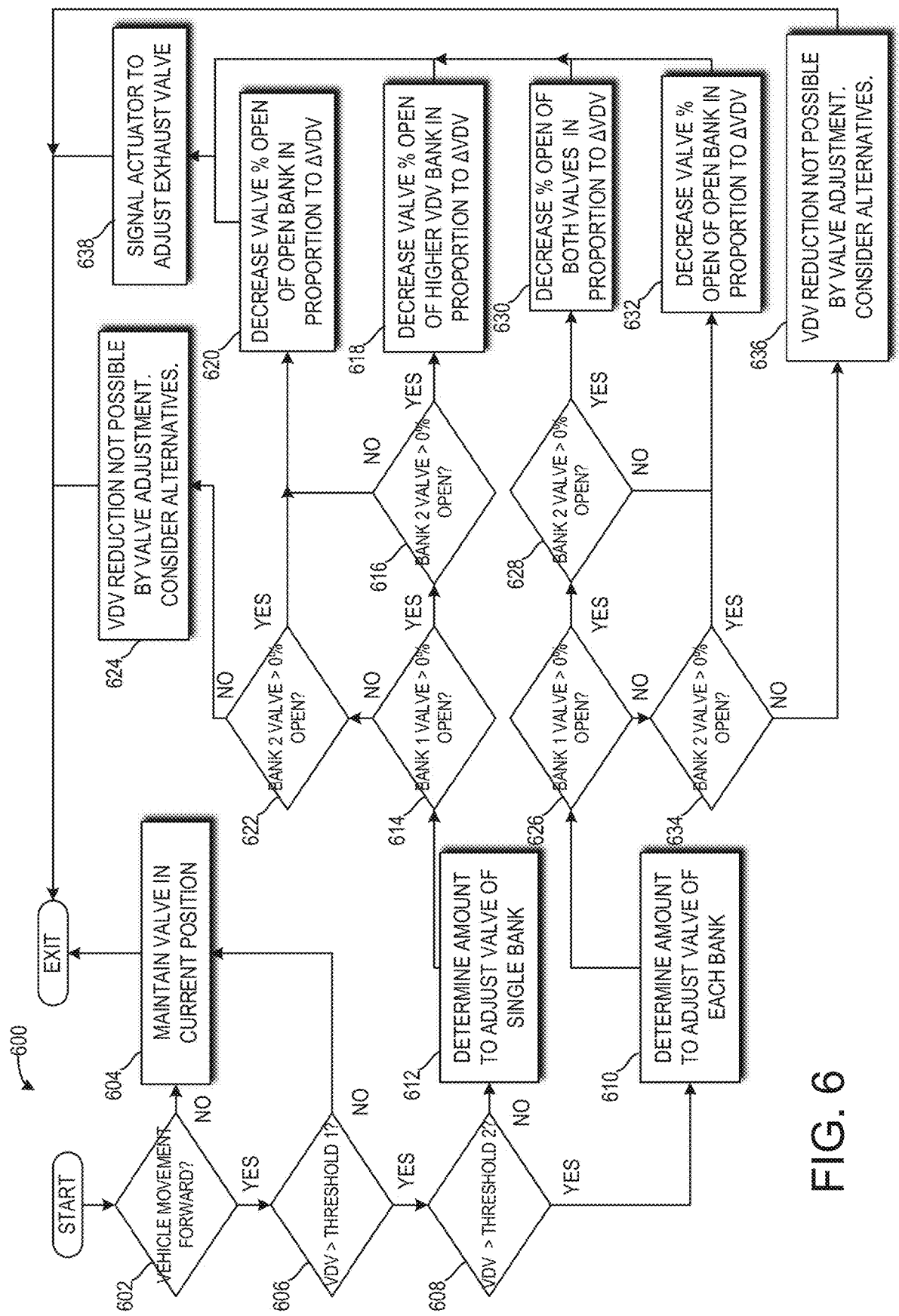
FIG. 6 illustrates a method for differentially adjusting exhaust tuning valves based on vehicle moving direction and a vibration dose valve (VDV).

The exhaust tuning valves may also be adjusted via data stored in an engine sound map. The engine sound map may be selected based on a driving style along with reception of parameters such as vehicle moving direction (forward/reverse), moving direction acceleration (which may be represented as an acceleration amount of the vehicle in m/s$^2$ with positive values for forward acceleration) and vibration dose value (VDV; where VDV is based on a root-mean-square acceleration raised to a fourth power) associated and/or indexed with the engine sound map, as shown in the method of FIG. 2. FIG. 5 illustrates a method for learning a driving behavior via a plurality of inputs. Engine sound maps corresponding to defensive driving behaviors are shown in FIGS. 3A and 3B. Therein, the exhaust tuning valve may be adjusted to adjust engine exhaust sounds. Engine sound maps corresponding to aggressive driving behaviors are shown in FIGS. 4A and 4B. Therein, the exhaust tuning valve may be adjusted to smooth suborder vibrations. In one example, the exhaust tuning valve may be maintained in more closed positions when VDV is high while the exhaust tuning valve may be maintained in more open or fully open positions when VDV is relatively lower. FIG. 6 illustrates a method for determining an amount to adjust exhaust valves when driving behavior matches the quiet mode. For example, if the exhaust tuning valve is adjusted to a position where cylinder imbalance is detected, then the controller carries out the method in FIG. 6 to determine valve adjustments (e.g., more opening and/or more closing) for one or both cylinder groups based on VDV to address cylinder balance. One example of operation according to the method of FIG. 6 is illustrated in the timeline FIG. 7.

Figure 1:
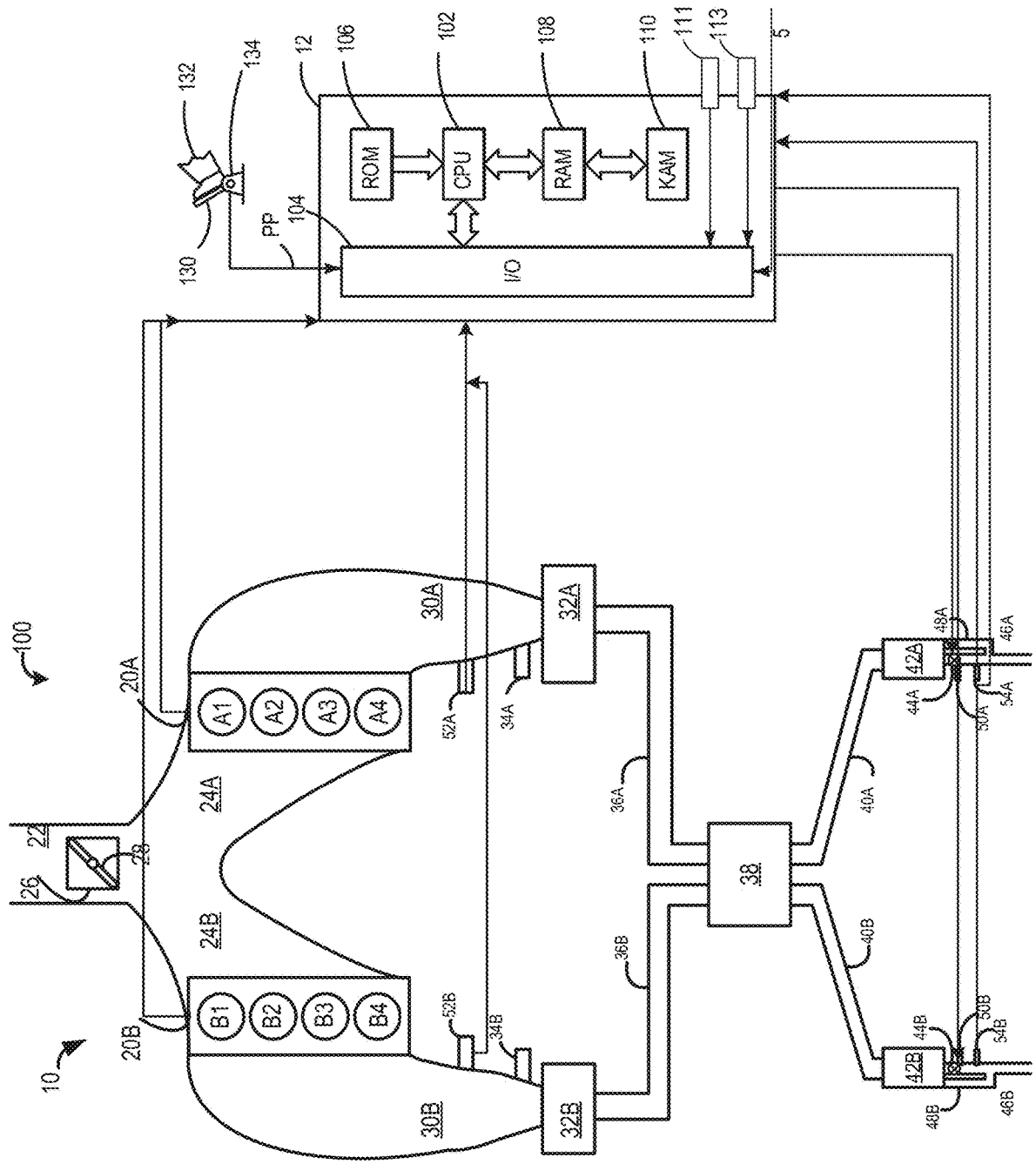
FIG. 1 schematically shows a V-engine in a vehicle with a dual bank exhaust system.

FIG. 1 depicts an engine 10 and system 100 for a vehicle. The vehicle may be an on-road vehicle having drive wheels which contact a road surface. System 100 includes direct injection engine 10 which comprises a plurality of cylinders. The various components of engine 10 may be controlled by electronic engine controller 12, which may be included in a vehicle control system.

Engine 10 includes multiple cylinders arranged in a V configuration (e.g., V-8 Engine). Engine 10 includes a plurality of combustion chambers or cylinders. The plurality of cylinders of engine 10 are arranged as groups of cylinders on distinct engine banks. In the depicted example, engine 10 includes a first engine cylinder bank 20A and a second engine cylinder bank 20B. Thus, the cylinders are arranged as a first group of cylinders (four cylinders in the depicted example) arranged on first engine cylinder bank 20A and labeled A1-A4, and a second group of cylinders (four cylinders in the depicted example) arranged on second engine cylinder bank 20B labeled B1-B4. It will be appreciated that while the example shows a V-engine with cylinders arranged on different banks, this is not meant to be limiting, and in alternate examples, the engine may be an in-line engine with all engine cylinders on a common engine bank but with separate groups coupled via separate exhaust manifolds to different exhaust passages and tail-pipe outlets.

Engine 10 can receive intake air via an intake passage 22 communicating with branched intake manifold 24A, 24B. Specifically, first engine cylinder bank 20A receives intake air from intake passage 22 via a first intake manifold branch 24A while second engine cylinder bank 20B receives intake air from intake passage 22 via second intake manifold branch 24B. While first engine cylinder bank 20A and second engine cylinder bank 20B are shown with a common intake manifold, it will be appreciated that in alternate examples, the engine may include two separate intake manifolds. The amount of air supplied to the cylinders of the engine can be controlled by adjusting a position of throttle 26 on throttle plate 28. Additionally, an amount of air supplied to each group of cylinders on the specific banks can be adjusted by varying an intake valve timing of one or more intake valves coupled to the cylinders.

Combustion products generated at the cylinders of first engine cylinder bank 20A are directed to one or more emission control devices in first exhaust manifold 30A where the combustion products are treated before being vented to the atmosphere. A first emission control device 32A is coupled to first exhaust manifold 30A. First emission control device 32A may include one or more exhaust catalysts. Exhaust gas generated at first engine cylinder bank 20A is treated at first emission control device 32A Combustion products generated at the cylinders of second engine cylinder bank 20B are exhausted to the atmosphere via second exhaust manifold 30B. A second emission control device 32B is coupled to second exhaust manifold 30B. Second emission control device 32B may include one or more exhaust catalysts. Exhaust gas generated at second engine cylinder bank 20B is treated at emission control device 32B.

Various sensors may be coupled to engine 10. For example, a first exhaust gas sensor 34A may be coupled to the first exhaust manifold 30A of first engine cylinder bank 20A, upstream of first emission control device 32A while a second exhaust gas sensor 34B is coupled to the second exhaust manifold 30B of second engine cylinder bank 20B, upstream of second emission control device 32B. In further examples, additional exhaust gas sensors may be coupled downstream of the emission control devices. Still other sensors, such as temperature sensors, may be included, for example, coupled to the underbody emission control device(s). The first exhaust gas sensor 34A and the second exhaust gas sensor 34B may include exhaust gas oxygen sensors, such as EGO, HEGO, or UEGO sensors.

As shown in FIG. 1, the exhaust passages 36A and 36B of each bank may pass through an underbody resonator 38. However, in alternate embodiments, the resonator may not be included in engine 10. In some examples, the exhaust passages may be maintained separate even in the resonator, but in some examples there may be fluidic communication and mixing between the passages via the resonator. Nevertheless, the two passages shown are still maintained substantially separate from one another, and are fully maintained separate after exiting the resonator, where they each lead to their own separate tail-pipe outlet.

In some examples, after the resonator, the exhaust flow is delivered via a first exhaust pipe 40A (on the first engine bank side) and second exhaust pipe 40B (on the second engine bank side), which may be continuations of the respective exhaust passages entering the resonator and leading to two separate tailpipe mufflers. First exhaust pipe 40A includes a first muffler 42A and a first active exhaust tuning valve 44A positioned downstream of the first muffler 42A. When the first active exhaust tuning valve 44A is open, exhaust flow exits the first muffler 42A via the first active exhaust tuning valve 44A and continues on to a first outlet 46A of the first exhaust pipe 40A (which may be coupled to a first tailpipe). However, when the first active exhaust tuning valve 44A is closed, the exhaust flow exits the first muffler 42A via a first bypass duct 48A. In this closed position, exhaust flow may be restricted via first bypass duct 48A. Similarly, a second exhaust pipe 40B (which may be coupled to a second tailpipe) includes a second muffler 42B, a second active exhaust tuning valve 44B positioned downstream of the second muffler 42B. The second active exhaust tuning valve 44B functions similarly to first active exhaust tuning valve 44A, as described above, with a second outlet 46B, and a second bypass duct 48B is included around the second active exhaust tuning valve 44B. The exhaust tuning valves may be continuously adjusted between fully open and fully closed.

The controller may adjust the positions of the first active exhaust tuning valve 44A and the second active exhaust tuning valve 44B (e.g., between fully open and fully closed) in order to control exhaust noise to a desired level (e.g., based on engine operating conditions). As an example, the exhaust noise level may be higher when each of the first active exhaust tuning valve 44A and the second active exhaust tuning valve 44B are open relative to the exhaust noise level when each of the first active exhaust tuning valve 44A and the second active exhaust tuning valve 44B are closed. Closing of one or more of the first active exhaust tuning valve 44A and the second active exhaust tuning valve 44B may attenuate the audible exhaust noise.

In the example dual bank exhaust systems, as shown in FIG. 1, both active exhaust tuning valves (e.g., valves 44A, 44B shown in FIG. 1), on the separate banks, are configured to behave uniformly to achieve uniform exhaust sound levels. For example, the two active exhaust valves may be commanded to a substantially same position, which in one example may be within 5% of one another) in order to achieve a desired and uniform exhaust sound level. In this way, the active exhaust tuning valves 44A, 44B may be adjusted to a more open position to increase the noise or to a more closed position to decrease the noise. Adjusting the exhaust tuning valves 44A, 44B will be described in greater detail below with respect to FIG. 2 through FIG. 7.

A first position sensor 50A may be coupled to the first active exhaust tuning valve 44A and a second position sensor 50B may be coupled to the second active exhaust tuning valve 44B. Positions of the active exhaust tuning valves 44A, 44B may be estimated based on inputs from the first position sensor 50A and the second position sensor 50B, respectively. In one example, as an active exhaust valve is commanded to move from an open position to a closed position, the change in valve position may be tracked via the corresponding position sensor.

Various temperature sensors may be included in the exhaust system of engine 10, including exhaust manifold temperature sensor 52A and exhaust manifold temperature sensor 52B (adapted to measure temperature of exhaust gas within the exhaust manifold to which they are coupled) and exhaust gas temperature sensor 54A and exhaust gas temperature sensor 54B (adapted to measure the exhaust temperature downstream of the active exhaust valve proximate to where it is positioned). In alternate embodiments, the exhaust system may not include some or all of these temperature sensors, and instead, temperatures may be modeled based on other engine operating conditions, as explained further herein.

Electronic engine controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, including engine speed, vehicle speed, traveling direction (e.g., from an accelerometer, as discussed herein), steering wheel angle, and exhaust manifold temperature sensors 52A and 52B and exhaust gas temperature sensors 54A and 54B. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

The controller 12 may be coupled to a two-axis accelerometer 111 and an inertial measurement unit (IMU) sensor 113. As will be described in greater detail below, feedback from the two-axis accelerometer 111 and the IMU sensor 113 may provide data for determining a plurality of parameters such as a steering wheel angle, lateral acceleration, longitudinal acceleration, lateral speed, longitudinal speed, VDV and the like for adjusting a position of the active exhaust tuning valves 44A, 44B. Additionally, the plurality of inputs may be used to automatically determine a driver behavior without a vehicle operator selecting their behavior. As such, vehicle maneuvers may be classified as defensive or aggressive behaviors, which may affect a position to which the active exhaust tuning valves 44A, 44B are adjusted in response to the input. Thus, for the same input value, the active exhaust tuning valves 44A, 44B may be in a first position for a defensive behavior and a second position, different than the first position, for an aggressive behavior.

Turning now to FIG. 2, it shows a method 200 for adjusting a position of an exhaust tuning valve, such as the active exhaust tuning valves 44A, 44B of FIG. 1, to adjust an exhaust noise level based on an identified driving style, steering wheel angle, and engine sound maps (depicted in FIGS. 3-4). Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below. For example, the controller may signal to an actuator of the exhaust tuning valve to adjust a position of the exhaust tuning valve in response to receiving an input during a determined driver behavior to adjust an engine noise.

The method 200 begins at 202, which includes determining, estimating, and/or measuring current engine operating parameters. Current engine operating parameters may include, but are not limited to, one or more of manifold vacuum, throttle position, engine speed, engine load, accelerator pedal position, engine temperature, and air/fuel ratio.

The method 200 proceeds to 204, which comprises determining a driving style and/or a driving behavior. In one example, the driving behavior is classified via supervised, machine learning receiving and/or estimating a plurality of inputs including longitudinal and lateral acceleration and steering wheel angle. Classifying a driving behavior and learning input values associated with the driving behavior is described in further detail with respect to FIG. 5. By classifying the driving behavior, the method 200 may automatically determine the driving behavior, resulting in reduced driver distractions and an enhanced driving experience as the driver is not forced to change modes multiple times to produce desired engine sounds as will be discussed in further detail below.

The method 200 proceeds to 206, which comprises determining if the driving style is defensive. The driving style may be based on a driver history and/or a plurality of inputs received during a current drive cycle. The plurality of inputs may include a throttle position, braking force, longitudinal speed, lateral speed, longitudinal acceleration, lateral acceleration, steering wheel angle, yaw rate, pitch, and roll. In one example longitudinal and lateral acceleration, along with steering wheel angle, may be the main factors when determining the driving style. The longitudinal speed and acceleration may be measured along a longitudinal axis of the vehicle whereas the lateral speed and acceleration may be measured along a lateral axis of the vehicle, perpendicular to the longitudinal axis.

If the driving style is not defensive, then the method 200 proceeds to 208 to determine if the vehicle is arranged in a geofenced area. A geofenced area may correspond to a neighborhood, a school, an urban area (e.g., a downtown metropolis), a park, a hospital, a church, and the like. A vehicle may be in a geofenced area if the vehicle is within a threshold radius of the geofenced area (e.g., with 1 kilometer). The geofenced areas may desire reduced noises from vehicles during certain times of the day or at all times of the day. A vehicle location may be determined based on feedback from a navigation system or other location device (e.g., cell phone).

If the driving style is defensive, then the method 200 proceeds to 210 to determine if the driving style corresponds to a quiet mode. The quiet mode may correspond to when the vehicle is in a geofenced area. Additionally or alternatively, the quiet mode behavior may correspond to low steering wheel angles and low longitudinal and lateral accelerations. For example, if a lateral acceleration is less than a lower threshold lateral acceleration, which is less than the threshold lateral acceleration, then a sub-category of the current defensive driving style may include where the driving style corresponds to a quiet mode. As such, the vehicle operator may not desire producing high amount of engine noise as a courtesy to their surrounding environment.

If the quiet mode matches the current driving style or if the vehicle is in a geofenced area, then the method 200 proceeds to 212 to adjust the exhaust tuning valve between partially open and fully closed positions based on the steering wheel angle and the FIG. 3A engine sound map, which shows a normalized valve opening setting as a function of the moving direction acceleration and VDV value, where the system then controls the exhaust valve to the setting (with zero being fully closed and 1 being fully open). Then the method 200 proceeds to 214 to differentially adjust one or more tuning valves to a determined position that can range from partially open to fully closed, and there between, based on vehicle moving direction and VDV. In one example, a valve coupled primarily to a group of cylinders having a higher torque output compared to another group may be moved to be more closed position, while maintaining the other exhaust tuning valve at a constant position. An amount of adjustment to the moved valve may be based on a degree of imbalance (with a greater imbalance generating a larger position adjustment), and further based on a driving mode (with a quite mode having a greater adjustment than an aggressive mode), in one example. Thus, in an example, the greater the imbalance, the more the valve is closed, up to fully closed. At that point, the other exhaust tuning valve may be opened if it is determined that further adjustment is requested in response to the imbalance, such as if the imbalance stays above a non-zero threshold level. In another case, when higher than a threshold VDV is detected and only one exhaust valve is open, only the open valve is moved partially toward or completely to the fully closed position. The fully closed position may increase exhaust backpressure to a highest value, where noise is maximally muffled. The partially open position may decrease exhaust backpressure to a lower value, where noise is sufficiently muffled.

However, while the backpressure cost of decreasing the valve % opening may be most desirable in a quiet mode, such adjustments can be utilized in other modes as well. In another example both exhaust tuning valves may be adjusted in response to group imbalance, where the higher VDV cylinder bank exhaust valve may be adjusted from 40% open position to a 10% open position in response to the imbalance. Additionally, the lower VDV bank exhaust valve may be adjusted from the 40% open position to 15% open position If the quiet mode does not match the current driving style, then the method 200 proceeds to 216, which includes the driving style matching a moderate mode. The method 200 proceeds to 218, which includes adjusting the exhaust valve between the more closed position and a more open position based on steering wheel angle and the engine sound map of FIG. 3B. The moderate mode may provide an increase in exhaust sound during a vehicle start-up, revving in neutral, and while driving relative to the quiet mode. It is understood that the moderate driving style driver may desire the differential adjustment of exhaust valves to balance engine vibration. In the case of desiring lower vibration when one or both exhaust valves are more open, the valve % opening may be decreased with a concurrent decrease in undesirable engine noise. In the case of desiring reduced engine vibration, the valve % opening may be decreased with an increase in exhaust backpressure.

Returning to 208, if the driving style is not defensive and the vehicle is not arranged in a geofenced area, then the method 200 proceeds to 220, which includes the driving style being aggressive. The method 200 proceeds to 222 to determine if the aggressive driving style matches a track mode. If the aggressive driving style is not a track mode driving style, then the method 200 proceeds to 224, which includes the driving style being in a sport mode. The method 200 proceeds to 226, which includes adjusting the exhaust valve between a more open position and a closed position based on steering wheel angle and the engine sound map of FIG. 4A.

Returning to 222, if the driving style is a track mode driving style, the method 200 proceeds to 228, which includes adjusting the exhaust valve between a more open position and a more closed position based on steering wheel angle and the engine sound map of FIG. 4B.

It will be appreciated that for the some inputs and conditions, the exhaust valve in the aggressive driving modes may be in a more open position compared to the quiet mode and the moderate mode. For example, it is understood that a driver who matches the aggressive driving style may not desire the differential adjustment of exhaust valves to balance engine vibration with the backpressure cost. However, in the case of substantial engine imbalance, and/or to enhance desirable engine sounds, and/or given certain inputs and conditions, exhaust valve closure may be desirable in the aggressive driving styles Turning now to FIGS. 3A through 4B, they show engine sound maps for the quiet mode, the moderate mode, the sport mode, and the track mode, respectively. The engine sound maps represent a three dimensional relationship among VDV, a vehicle moving direction acceleration, and an opening of an exhaust tuning valve, and illustrate an adjustment of an exhaust tuning valve in response to one or more inputs including direction of vehicle movement and VDV. The exhaust tuning valve may be adjusted to a fully closed position, a fully open position, or to a position there between. The fully closed position may correspond to a position of the exhaust tuning valve where an exhaust backpressure is the highest. Thus, the fully open position may correspond to a position of the exhaust tuning valve where the exhaust backpressure is the lowest. In this way, the fully closed position may impede exhaust gas flow more than the fully open position. In one example, exhaust gas may still flow past the exhaust tuning valve in the fully closed position, however, its flow may be impeded, resulting in high levels of exhaust backpressure. Herein, the fully closed position is described as a 0% open position and the fully open position is described as a 100% open position. As such, a 30% open position more closely resembles the fully closed position (e.g., 0% open position) more than the 100% open position. As will be described below, the engine sound maps generally show valve opening is decreased as VDV increases. Special adjustments to valve opening based on moving direction acceleration and VDV occur in particular map regions based on driving style.

Turning now to FIG. 3A, it shows an example quiet mode engine sound map 300 illustrating example exhaust tuning valve positions based on various vehicle moving direction accelerations and VDV. The sum of these two components, which may be estimated via feedback from a two-axis accelerometer, such as accelerometer 111 of FIG. 1, and an IMU sensor such as IMU sensor 113 of FIG. 1, may be equal to engine noise and vibration level.

As shown, a highest opening of the exhaust tuning valve during the quiet mode occurs at a lowest VDV, wherein the highest opening of the exhaust tuning valve is 70% when VDV is 0 and may be maintained at moving direction accelerations between 0 and 100 m/s². Along the highest moving direction acceleration value (100 m/s²), the exhaust tuning valve open percentage is adjusted between 10 and 70%, wherein 30% corresponds to a VDV of 0.6 m/s$^{1.75}$ and 20% corresponds to a VDV of 0.7 m/s$^{1.75}$. Along the highest VDV (e.g., 1), the exhaust tuning valve may be nearly closed at 10%, and maintained at 10% until VDV drops below 0.75 m/s$^{1.75}$. At low-intermediate VDV (e.g. 0.3-0.45) and low moving direction accelerations (e.g. 30-50 m/s²), the exhaust tuning valves may be fully closed. For example, when moving direction acceleration is at 30 m/s² and VDV is at 0.3 m/s$^{1.75}$, the exhaust tuning valve may be closed (e.g. 0%), and at a moving direction acceleration of 50 m/s² and VDV at 0.3 m/s$^{1.75}$, the exhaust tuning valve may also be closed (e.g. 0%). Whereas, at a VDV of 0.3 and moving direction acceleration of 60 m/s², the exhaust tuning valve may be adjusted to 50% open. In the quiet mode, at low-intermediate VDV and moving direction acceleration conditions, engine vibration reduction through closure of the exhaust tuning valves may be desirable.

Turning now to FIG. 3B, it shows an example moderate mode engine sound map 350 illustrating example exhaust tuning valve positions relative to moving direction acceleration and VDV. As will be described herein, generally, the exhaust tuning valve is closed as VDV value increases.

Similar to FIG. 3A, along the highest movement direction value (e.g. 100 m/s²), the exhaust tuning valve open percentage is adjusted between 10 to 70%, wherein the exhaust tuning valve is 30% open at a VDV of 0.6 to 0.7 m/s$^{1.75}$ and 70% open at a VDV of 0 m/s$^{1.75}$. Along the highest VDV values (e.g. 1 m/s$^{1.75}$ to 0.75 m/s$^{1.75}$) the exhaust tuning valve opening is maintained at 10%. The exhaust tuning valve is 60% open when the vehicle moving direction acceleration is between 0 and 100 m/s² and VDV is 0.1 m/s$^{1.75}$. When VDV values are intermediate (e.g. 0.45-0.6 m/s$^{1.75}$) and moving direction accelerations are intermediate (50-70 m/s²), the exhaust valve may be adjusted to nearly closed (10%). For example, when VDV is 0.5 m/s$^{1.75}$ and moving direction acceleration is 60 m/s², the valve opening may be 10% open. Whereas, when VDV is 0.3 m/s$^{1.75}$ and moving direction acceleration is 50 m/s², the exhaust tuning valve may be 50% open. As such, given some inputs and conditions more engine noise is produced in the moderate mode relative to the quiet mode due to the exhaust tuning valve being in a more open position for similar VDV and moving direction acceleration. For intermediate VDV and moving direction acceleration conditions, engine vibration reduction through nearly closing the exhaust valves may be desirable.

Turning now to FIG. 4A, it shows an example sport mode engine sound map 400 illustrating example exhaust tuning valve positions relative to moving direction acceleration and VDV. As will be described herein, generally, the exhaust tuning valve % opening closes as VDV value increases.

For example, along the highest moving direction acceleration value (e.g. 100 m/s²), the exhaust tuning valves may adjusted between 70 to 10% open, wherein the exhaust tuning valve is 10% open when VDV is between 1 and 0.8 m/s$^{1.75}$. The exhaust valve may be adjusted to 70% open when VDV is low (e.g. 0 m/s$^{1.75}$) and the moving direction acceleration is between 0 and 100 m/s². When VDV is highest and when VDV is lowest, the engine sound map for the sport mode is similar to the engine sound maps for the quiet and moderate modes (e.g. FIGS. 3A and 3B, respectively).

For low-intermediate VDV (e.g. 0.3-0.5 m/s$^{1.75}$) and moving direction acceleration exceeding 20 m/s² up to 90 m/s², exhaust tuning valve may be fully closed. For example, when VDV is 0.4 m/s$^{1.75}$ and moving direction acceleration is 30 m/s², the exhaust tuning valve may be closed (0%). If moving direction acceleration is 70 m/s² and VDV remains at 0.4 m/s$^{1.75}$, exhaust tuning valve may remain closed (0%). At higher VDV (e.g. 0.6 m/s$^{1.75}$) and increased moving direction acceleration (e.g. 70 m/s²), the exhaust tuning valve may be opened to 30%. Thus, while generally the exhaust tuning valve % opening is decreased as VDV increases, compared with defensive driving styles, for low-intermediate VDV values and a wider range of moving direction accelerations, engine vibration reduction and sound modification through fully closing the exhaust valves may be desirable.

Turning now to FIG. 4B, it shows an example track mode engine sound map 450 illustrating example exhaust tuning valve positions relative movement direction and VDV. For all values of movement direction acceleration, VDV determines the exhaust tuning valve position. Thus, the track mode attempts to produce desirable engine sounds and mitigate sub-order vibrations via the exhaust tuning valves based on VDV value. For example, at the highest VDV values (e.g. 0.8 and 1 m/s$^{1.75}$), the valve opening may be reduced to 10% open. Whereas at very low VDV values, valve opening is adjusted to 70% open for any moving direction acceleration value. At moderate levels of VDV (e.g. 0.5-0.6 m/s$^{1.75}$) the valve opening is adjusted to 40% for any moving direction acceleration value. In this way, an engine sound is optimized during the track mode and an exhaust tuning valve position is adjusted based on cylinder imbalance.

Turning now to FIG. 5, it shows a method 500 for classifying inputs received to characterize a vehicle driving behavior as aggressive or defensive behavior. The aggressive and defensive behaviors may be further sub-categorized into a track mode and a sport mode in the example of aggressive behavior and a moderate mode and a quiet mode in the example of defensive behavior. In one example, the method 500 uses feedback from a two-axis accelerometer (e.g., accelerometer 111 of FIG. 1) and an IMU sensor (e.g., IMU sensor 113 of FIG. 1) to provide data into a fuzzy logic system to classify a driver as aggressive or defensive, and to further sub-categorize the vehicle operator as described. The driver classification may be executed via supervised learning techniques such that engine sound maps may accurately predict a desired engine sound. In some examples, random forest or support vector machines may be the supervised learning technique. In this way, the method 500 may represent a method for learning a driving behavior for a single driver, wherein the learned driver behavior may be converted into an associated engine sound map via an algorithm.

The method 500 may learn a driving behavior for a plurality of drivers. In some examples, additionally or alternatively, threshold described with respect to FIG. 5 may be adjusted for different drivers. For example, if a first driver is typically a defensive style driver, then a threshold steering wheel angle for the first driver may be a lower value than a value of the threshold steering wheel angle for a second driver that is typically an aggressive driver. In this way, when the first driver desires a louder engine sound, a maneuver executed by the first, more defensive driver may be less aggressive than a maneuver by the second driver to achieve the same engine sound.

The method 500 begins at 502, which includes receiving inputs including one or more of a throttle position at 504, a braking force at 506, a steering wheel angle at 508, longitudinal and lateral speeds at 510, longitudinal and lateral accelerations at 512, yaw rate at 514, pitch at 516, roll at 518, and velocity at 520. Each of the inputs may be estimated and/or directly measured via sensors arranged onboard the vehicle, such as the two-axis accelerometer and the speed sensor.

The method 500 proceeds to 522, which includes determining if one of the inputs received is greater than a respective threshold. For example, a throttle position may be compared to a threshold throttle position, wherein a position more open than the threshold throttle position may be associated with an aggressive driving behavior and a desired for greater engine noise. In one example, the threshold throttle position may correspond to a 60% open throttle position. However, it will be appreciated that the threshold throttle position may be greater than or less than 60% open throttle position.

As another example, the braking force, which may be correlated to a deceleration rate, may be compared to a threshold braking force. The threshold braking force may be based on a threshold deceleration rate (e.g., 7 m/s or higher). A braking force greater than the threshold braking force may correspond to an aggressive driving behavior, which may also correspond to a desired for louder engine noise.

As another example, the steering wheel angle may be compared to a threshold steering wheel angle. The steering wheel angle, and therefore the threshold steering wheel angle, may be based on a combination of a steering wheel position and a lateral acceleration. The threshold steering wheel angle may be equal to 40 degrees. However, it will be appreciated that the threshold steering wheel angle may be equal to other angles corresponding to aggressive driving behavior. If the steering wheel angle is greater than the threshold steering wheel angle, then the driving behavior may be associated with an aggressive driving behavior. As described above, the steering wheel angle may be a measure of a deviation of the steering wheel from a center position (e.g., 0 degrees). Thus, the steering wheel angle increases as the steering wheel deviates from the center position in a clockwise or a counterclockwise direction.

If the received input is greater than its corresponding threshold, then the method 500 proceeds to 524 and categorizes the driving style as an aggressive driving style. In some examples, additionally or alternatively, the method 500 may account for each variable of the plurality of variables, wherein a function may determine an aggressive driving behavior based on a combination of inputs exceeding their corresponding thresholds. In one example, the function may determine an aggressive driving behavior if three or more of the inputs exceed respective thresholds. The method 500 then proceeds to 526, to determine if the input is greater than a corresponding upper threshold. For example, the steering wheel angle is compared to an upper threshold steering wheel angle, which is greater than the threshold steering wheel angle. If the steering wheel angle is greater than the upper threshold steering wheel angle, then the method 500 proceeds to 528, to learn track behavior inputs. As such, an engine sound map corresponding to the track mode, such as engine sound map 450 of FIG. 4B, may be updated to adjust a position of the exhaust tuning valve based on one or more of the inputs received more closely to a given driver. In one example, the exhaust tuning valve is maintained in a more open position to provide a maximum engine noise when engine vibration are not detected during the track mode.

As described above, the method 500 may learn behavior for a plurality of vehicle operators (e.g., drivers). As such, the first driver, who is more defensive than the second driver, may produce inputs that correspond to a track behavior that are different than (e.g., lower in magnitude and/or less aggressive) than inputs produced by the second driver. Furthermore, the threshold and upper threshold used to determine if inputs provided by the first driver are aggressive may be less than the same threshold and upper threshold used for the second driver.

If the input received is not greater than its corresponding upper threshold, then the method proceeds to 530 to learn sport behavior inputs. For example, if the steering wheel angle is greater than the threshold steering wheel angle and less than the upper threshold steering wheel angle, then the inputs may be associated with a sport behavior of a particular driver. Additionally or alternatively, an engine sound map associated with the sport behavior of the particular driver may be updated via an algorithm.

Returning to 522, if the input is not greater than the threshold, then the driving style is categorized as a defensive driving style at 532. The method 500 then proceeds to 534, which comprises determining if the input is less than a corresponding lower threshold. For example, if the steering wheel angle is less than a lower threshold steering wheel angle, wherein the lower threshold steering wheel angle is less than the threshold steering wheel angle, then the method 500 proceeds to 536, which includes learning quiet behavior inputs. The inputs may be associated with a quiet behavior for a particular driver of the vehicle and an engine sound map of the quiet behavior for the particular driver may be correspondingly updated to produce desired engine sounds.

If the input is not less than the lower threshold, then the method 500 proceeds to 538, which includes learning moderate behavior inputs. The inputs may be associated with a moderate behavior for a particular driver of the vehicle and an engine sound map of the moderate behavior for the particular driver may be correspondingly updated to produce desired engine sounds.

As mentioned above, the method 500 may learn aggressive and defensive behaviors for a plurality of drivers of the vehicle. As a non-limiting example, for the first, more defensive driver, an aggressive maneuver may be lesser in magnitude than an aggressive maneuver for the second, more aggressive driver. Using steering wheel angle as an example, if the first driver is driving with a steering wheel angle of 30 degrees, then this may be classified as an aggressive behavior, while for the second driver, a steering wheel angle of 50 degrees may be classified as an aggressive behavior. However, during both steering wheel angles, respective engine sounds maps for the first driver and the second driver may result in the exhaust tuning valve moving to the same position to provide the same noise. That is to say, the first driver with the steering wheel angle at 30 degrees results in the exhaust tuning valve being actuated to the same position as the second driver with the steering wheel angle at 50 degrees.

Turning now to FIG. 6, it shows a method 600 for determining differential exhaust valve adjustment in response to periodically detected imbalance vibration based on vehicle moving direction and VDV when the driving style matches the quiet mode. Vehicle moving direction and VDV are detected in one example by the two-axis accelerometer and inertial measurement unit (IMU) sensors and communicated to the controller. The method 600 begins at 602, which includes determining the forward movement of the vehicle. If the vehicle travel is not forward, then the method proceeds to 604 to maintain the valves in current position. For example, if the vehicle is in reverse, then the method may determine to maintain valves in the current position.

Returning to 602, the method 600 proceeds to 606 to determine if the VDV is above a first threshold. In some examples the first threshold is 30% maximum VDV as determined by engine testing. If the VDV is not above a first threshold, then the method proceeds to 604 to maintain the valves in current position. For example, if combustion torque imbalances are detected but at very low levels, then the method may determine to maintain valves in current position.

If the VDV is above a first threshold, then the method proceeds to 608 to determine if the VDV is above a second threshold. In some examples the second threshold is 50% maximum VDV as determined by engine testing. If VDV is above the second threshold, the method proceeds to 610 to determine the amount to adjust the exhaust valves of each cylinder bank. If the VDV is not above the second threshold, the method proceeds to 612 to determine the amount to adjust a single bank.

From 612, the method 600 proceeds to 614 to determine whether the first bank valve is more than 0% open. If the first bank valve is more than 0% open, then the method proceeds to 616 to determine whether the second bank valve is more than 0% open. If the second bank valve is also open, the method proceeds to 618. For example, if both valves are open, the valve with the higher VDV will be closed. For example, if the higher VDV valve is 70% open, the maximum opening in quiet mode, the higher VDV valve opening will be closed by half from 70% to 35%. The method 600 proceeds to 618 to signal the actuator to adjust the exhaust valve to close the determined amount.

Returning to 614, if the valve of the first cylinder bank is more than 0% open and the valve of the second bank is closed, the method 600 proceeds to 620. In this case, only the open valve may be decreased. If the open valve has the higher VDV than the closed valve, the valve % opening may be reduced. For example, if the open valve is 10% open, it may be closed to 0%. If the closed valve has a higher VDV than the open valve, there is no valve adjustment to reduce cylinder imbalance in the quiet mode. In other driving modes it may be desirable to open a valve to reduce cylinder imbalance. The method 600 proceeds to 638 to signal the actuator to adjust the exhaust valve to close the determined amount.

Returning to 614, if the valve of the first cylinder bank is not more than 0% open, the method 600 proceeds to 622 to determine whether the second bank valve is open. If the valve of the second bank is closed, the method proceeds to 624, where VDV reduction by closing valves is not possible. If the valve of the second bank is open, the method proceeds to 620 where the open valve may be decreased.

Returning to 610, if the VDV is above the second threshold, the method 600 proceeds to 626 to determine if the first cylinder bank is more than 0% open. If the first cylinder bank is more than 0% open, the method 600 proceeds to 628 to determine if the second cylinder bank is more than 0% open. If yes, the method 600 proceeds to 630, where both exhaust valves openings are decreased in proportion to VDV. For example, if the first cylinder bank VDV is greater than the second cylinder bank VDV, and the first cylinder bank exhaust valve is 30% open and second cylinder bank exhaust valve is 20% open, the exhaust valve of the first cylinder bank will decrease to 10% open and the exhaust valve of the second cylinder bank will decrease to 15% open. If the VDV difference is very great, the higher VDV bank may close from 30% to 0% and the lower VDV bank may close from 20% to 10%. The method 600 proceeds to 638 to signal the actuators to adjust the exhaust valves to close the determined amount.

Returning to 628, if the second exhaust bank valve is not open, only the exhaust valve of the open bank may be decreased in proportion to the difference in VDV between banks. For example, if the first exhaust valve is 40% open and the second exhaust valve is 0% open, if the VDV difference is very great, the first exhaust valve may close to 0%. If the VDV difference is less great, the first exhaust valve may close from 40% to 30%. The method 600 proceeds to 638 to signal the actuator to adjust the exhaust valve to close the determined amount.

Returning to 626, if the exhaust valve of the first bank is not open more than 0%, the method 600 proceeds to 634 to determine if the exhaust valve of the second bank is more than 0% open. If the exhaust valve of the second bank is more than 0% open, the method proceeds to 632 where the exhaust valve of the open bank may be closed by a determined amount. The method 600 proceeds to 638 to signal the actuator to adjust the exhaust valve to close the determined amount.

Returning to 634, if the exhaust valve of the second bank is not more than 0% open, the method 600 proceeds to 636 where VDV reduction is not possible by valve adjustment. In the quiet mode or otherwise, it may be the case that other adjustments to the engine operation are available to balance cylinders.

Figure 7:
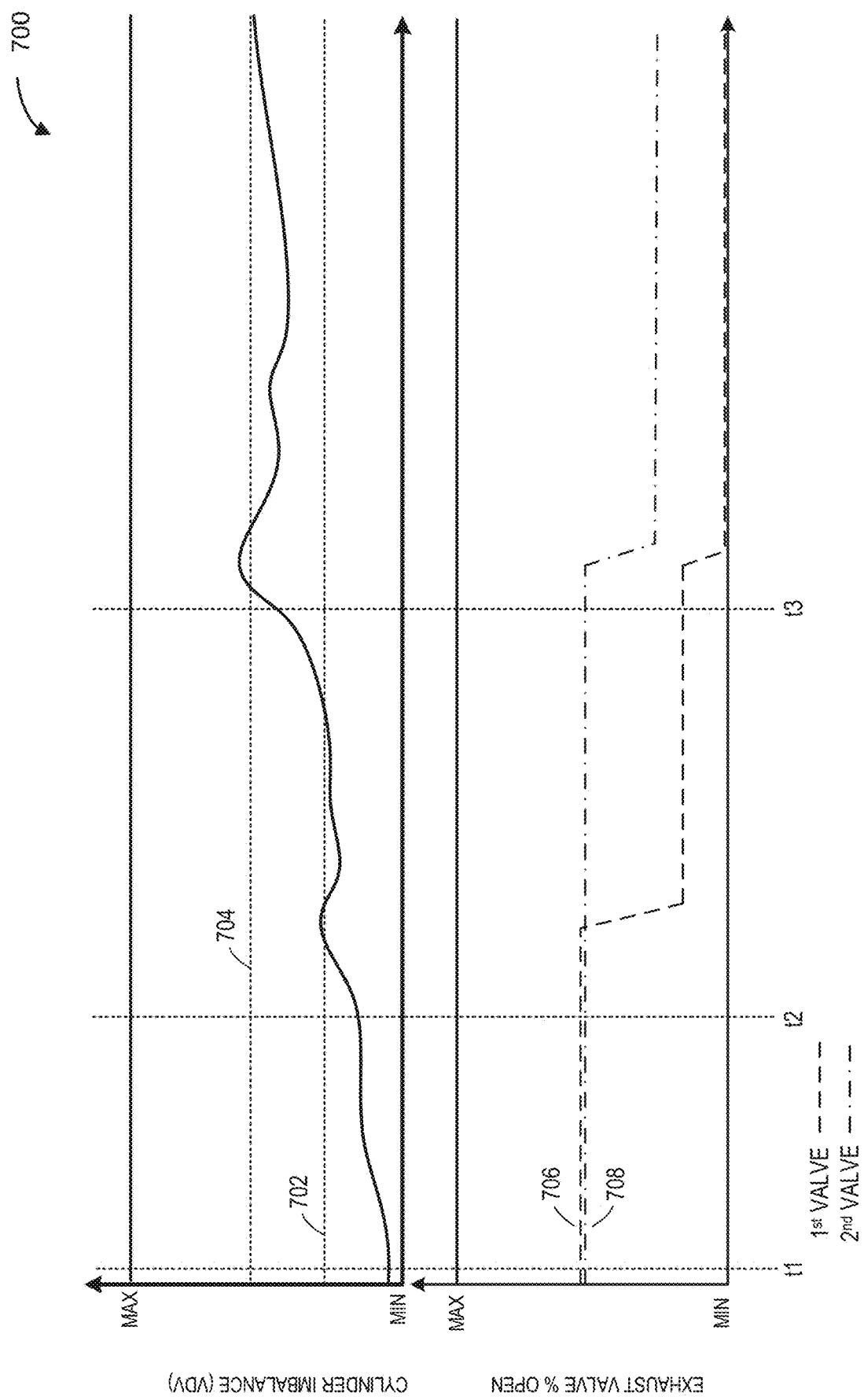
FIG. 7 illustrates an example timeline of vehicle operation including adjustment in response to detected combustion torque imbalance among the engine cylinders.

FIG. 7 shows an example timeline 700 illustrating differential adjustment of exhaust valves in an active exhaust valve coupled to an engine exhaust passage downstream of a muffler. The horizontal (x-axis) denotes time and the vertical markers t1-t3 identify significant times in the routine for cylinder balance.

The first plot, line 702, denotes a first cylinder imbalance threshold estimated via a two-axis accelerometer and IMU sensors. In one example the first threshold is 30% of maximum VDV as determined by engine testing. The second plot, line 704, denotes a second VDV threshold estimated via a two-axis accelerometer and IMU sensors. In one example the second threshold is 50% of maximum VDV. The third plot, line 706, shows operation of the first active exhaust to balance the first bank of cylinders. The fourth plot, line 708, shows operation of the second active exhaust to balance the second bank of cylinders. Operating the active exhaust valves includes determining the strength of the strength of the cylinder imbalance (VDV), determining whether an adjustment may to be made, determining which cylinder bank is contributing the greatest VDV to the imbalance, the amount to adjust one or more exhaust valves, and communicating the amount to adjust to the controller to signal the actuators to reduce the exhaust valve openings Prior to time t1, exhaust tuning valve positions may be adjusted to a common position (e.g. same position) in response to driving style and behavior, including steering wheel position and a plurality of other inputs. It should be appreciated that from time t1 to t2, plots 706 and 708 are shown with a slight offset only so that both lines are visible in the figure. At time t1, a modest increase in acceleration and speed cause a modest increase in cylinder imbalance. The imbalance is below first threshold 702. Current open settings of the first exhaust valve 706 and second exhaust valve 708 are maintained constant.

At t2, the acceleration and increased vehicle speed cause an increase in vibration in the engine. The cylinder imbalance is greater than the first threshold 702. The sensors detect the first cylinder bank is causing the greater VDV imbalance. In this first condition, the first exhaust tuning valve 706 is reduced by 65% to provide differential adjustment of the exhaust tuning valves, while the second exhaust tuning valve 708 is maintained constant.

At t3, the rapid acceleration and increased vehicle speed cause a greater increase in vibration in the engine. The cylinder imbalance is greater than the second threshold 704. The sensors detect the first cylinder bank is causing the greater VDV imbalance. The first exhaust tuning valve 706 is closed. The second exhaust tuning valve 708 is reduced by half.

At time t3, upon completion of the adjustment of the first and second exhaust tuning valve openings, the controller will continue to monitor the engine for cylinder imbalance. In the case that less imbalance vibration is detected (e.g. a second condition), the first and second valve openings may be adjusted to a common position (e.g. t1). In the case that cylinder imbalance is again detected, the method described in FIGS. 6 and 7 may be initiated. It is possible that in certain driving modes and the exhaust valves are in a fully closed position, it may not be possible to balance cylinders using exhaust tuning valves, as increases in engine noise may not be desirable. In some driving modes the exhaust tuning valves may be opened or closed in to balance cylinder depending on desired engine noise and acceptable exhaust backpressure.

In this way, exhaust tuning valve position(s) may be adjusted in response cylinder imbalance. By adjusting the exhaust tuning valve position(s), cylinder imbalance may be adjusted to match a driver behavior without a driver behavior being selected by a driver while still addressing cylinder imbalance. The technical effect of adjusting the cylinder imbalance automatically is to enhance a driving experience. The driver's behavior is automatically determined without the driver selecting their current driver behavior, wherein an engine sound map is selected based on the driver behavior. The exhaust tuning valve position may be adjusted based on positions stored in the engine sound map in response to a vehicle moving direction acceleration and VDV.

An embodiment of a method comprises adjusting a position of an exhaust tuning valve arranged in an exhaust passage based on cylinder imbalance.

The disclosure also provides support for a method for controlling a vehicle with an engine and an active exhaust tuning valve, comprising: generating exhaust from a first group of cylinders and a second group of cylinders, the exhaust delivered in a first exhaust passage and a second exhaust passage to a first tailpipe and a second tailpipe, respectively, adjusting a first position of an exhaust tuning valve in the first exhaust passage to reduce an imbalance vibration generated by combustion torque imbalances between the first group of cylinders and the second group of cylinders.

In a first example of the method, the adjusting includes closing the exhaust tuning valve responsive to the imbalance vibration, including being responsive to a determination that the first group of cylinders is periodically generating higher torque than the second group of cylinders.

In a second example of the method, optionally including the first example, adjusting the exhaust tuning valve is further responsive to a one or more maps, the one or more maps representing a three-dimensional relationship among a vibration dose value, a vehicle moving direction acceleration, and an opening of the exhaust tuning valve.

In a third example of the method, optionally including one or both of the first and second examples, the vibration dose value is based on a root-mean-square acceleration raised to a fourth power.

In a fourth example of the method, optionally including one or more or each of the first through third examples, the adjusting includes maintaining a second position of the exhaust tuning valve in the second exhaust passage constant while adjusting the first position.

In a fifth example of the method, optionally including one or more or each of the first through fourth examples, the method further comprises: only mixing the exhaust between the first exhaust passage and the second exhaust passage in an underbody resonator before reaching two separate tailpipe mufflers.

In a sixth example of the method, optionally including one or more or each of the first through fifth examples, the method further comprises: adjusting a second position of the exhaust tuning valve in the second exhaust passage to reduce the imbalance vibration generated by the combustion torque imbalances between the first group of cylinders and the second group of cylinders.

In a seventh example of the method, optionally including one or more or each of the first through sixth examples, adjusting the first position is further responsive to a direction of vehicle travel.

The disclosure also provides support for a method for controlling a vehicle with an engine and an active exhaust tuning valve, comprising: generating exhaust from a first group of cylinders and a second group of cylinders, the exhaust delivered in a first exhaust passage and a second exhaust passage to a first tailpipe and a second tailpipe, respectively, adjusting a first position of an exhaust tuning valve in the first exhaust passage differentially from a second position of an exhaust tuning valve in the second exhaust passage to reduce an imbalance vibration generated by combustion torque imbalances between the first group of cylinders and the second group of cylinders.

In a first example of the method, the adjusting includes closing the exhaust tuning valve in the first exhaust passage responsive to the imbalance vibration.

In a second example of the method, optionally including the first example, adjusting the exhaust tuning valve in the first exhaust passage is further responsive to a vehicle moving direction.

In a third example of the method, optionally including one or both of the first and second examples, adjusting the exhaust tuning valve in the first exhaust passage is further responsive to a vibration dose value, wherein the vibration dose value is based on a root-mean-square acceleration raised to a fourth power.

In a fourth example of the method, optionally including one or more or each of the first through third examples, the adjusting includes maintaining the second position of the exhaust tuning valve in the second exhaust passage constant while adjusting the first position.

In a fifth example of the method, optionally including one or more or each of the first through fourth examples, the first position of the exhaust tuning valve and the second position of the exhaust tuning valve are based on a steering wheel angle.

In a sixth example of the method, optionally including one or more or each of the first through fifth examples, the method further comprises: adjusting the first position of the exhaust tuning valve in the first exhaust passage and the second position of the exhaust tuning valve in the second exhaust passage based on a driving style.

The disclosure also provides support for a system, comprising: an engine with a first group of cylinders and a second group of cylinders, a first exhaust passage coupled to the first group of cylinders and a second exhaust passage coupled to the second group of cylinders, the first exhaust passage terminating at a first tailpipe and the second exhaust passage terminating at a second tailpipe, a first exhaust tuning valve in the first exhaust passage, a second exhaust tuning valve in the second exhaust passage, and a control for during a first condition, adjusting a first position of the first exhaust tuning valve differentially from a second position of the second exhaust tuning valve responsive to imbalance vibration generated by combustion torque imbalances between the first group of cylinders and the second group of cylinders, and during a second condition with less imbalance vibration, adjusting the first position and the second position to a common position.

In a first example of the system, the system further comprises: an underbody resonator upstream of the first exhaust valve and the second exhaust tuning valve, where both the first exhaust passage and the second exhaust passage pass through the underbody resonator.

In a second example of the system, optionally including the first example, the engine is a V-8 engine.

In a third example of the system, optionally including one or both of the first and second examples, the engine is a direct injection engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling a vehicle with an engine and an active exhaust tuning valve, comprising:
   generating exhaust from a first group of cylinders and a second group of cylinders, the exhaust delivered in a first exhaust passage and a second exhaust passage to a first tailpipe and a second tailpipe, respectively; and
   adjusting a first position of an exhaust tuning valve in the first exhaust passage to reduce an imbalance vibration generated by combustion torque imbalances between the first group of cylinders and the second group of cylinders, wherein adjusting the exhaust tuning valve is further based on a vehicle moving direction and a vibration dose value based on a root-mean-square vehicle acceleration.

2. The method of claim 1, wherein the adjusting includes closing the exhaust tuning valve responsive to the imbalance vibration, including being responsive to a determination that the first group of cylinders is periodically generating higher torque than the second group of cylinders.

3. The method of claim 2, wherein adjusting the exhaust tuning valve is further responsive to one or more maps, the one or more maps representing a three-dimensional relationship among the vibration dose value, the vehicle moving direction acceleration, and an opening of the exhaust tuning valve.

4. The method of claim 3, wherein the vibration dose value is based on the root-mean-square acceleration raised to a fourth power.

5. The method of claim 1, wherein the adjusting includes at a lower vibration dose value, maintaining a second position of the exhaust tuning valve in the second exhaust passage more open while maintaining the first position more open, and at a first higher vibration dose value higher than the lower vibration dose value, maintaining the second position of the exhaust tuning valve in the second exhaust passage less open while maintaining the first position more open, and at a second higher vibration dose value higher than the first higher vibration dose value, maintaining the second position of the exhaust tuning valve in the second exhaust passage less open.

6. The method of claim 1, further comprising only mixing the exhaust between the first exhaust passage and the second exhaust passage in an underbody resonator before reaching two separate tailpipe mufflers.

7. The method of claim 1, further comprising adjusting a second position of the exhaust tuning valve in the second exhaust passage to reduce the imbalance vibration generated by the combustion torque imbalances between the first group of cylinders and the second group of cylinders.

8. The method of claim 1, wherein adjusting the first position is further responsive to the direction of vehicle travel including forward and reverse, even when a torque imbalance remains among the first and second groups of cylinders.

9. A method for controlling a vehicle with an engine and an active exhaust tuning valve, comprising:
generating exhaust from a first group of cylinders and a second group of cylinders, the exhaust delivered in a first exhaust passage and a second exhaust passage to a first tailpipe and a second tailpipe, respectively; and
adjusting a first position of an exhaust tuning valve in the first exhaust passage differentially from a second position of an exhaust tuning valve in the second exhaust passage to reduce an imbalance vibration generated by combustion torque imbalances between the first group of cylinders and the second group of cylinders, including at a first imbalance vibration level, the first and second positions are open, at a second imbalance vibration level higher than the first imbalance vibration level, the first position is still open and the second position more closed, and at a third imbalance vibration level higher than the second imbalance vibration level, the first position and second position are more closed, wherein adjusting the exhaust tuning valve in the first exhaust passage is further responsive to a vehicle moving direction including forward and reverse.

10. The method of claim 9, wherein the adjusting includes closing the exhaust tuning valve in the first exhaust passage responsive to the imbalance vibration.

11. The method of claim 10, wherein adjusting the exhaust tuning valve in the first exhaust passage is further responsive to a vibration dose value, wherein the vibration dose value is based on a root-mean-square acceleration raised to a fourth power.

12. The method of claim 9, wherein the adjusting includes maintaining the second position of the exhaust tuning valve in the second exhaust passage constant while adjusting the first position.

13. The method of claim 9, wherein the first position of the exhaust tuning valve and the second position of the exhaust tuning valve are based on a steering wheel angle.

14. The method of claim 9 further comprising adjusting the first position of the exhaust tuning valve in the first exhaust passage and the second position of the exhaust tuning valve in the second exhaust passage based on a driving style.

15. A system, comprising:
an engine with a first group of cylinders and a second group of cylinders,
a first exhaust passage coupled to the first group of cylinders and a second exhaust passage coupled to the second group of cylinders, the first exhaust passage terminating at a first tailpipe and the second exhaust passage terminating at a second tailpipe;
a first exhaust tuning valve in the first exhaust passage;
a second exhaust tuning valve in the second exhaust passage; and
a control for during a first condition, adjusting a first position of the first exhaust tuning valve differentially from a second position of the second exhaust tuning valve responsive to imbalance vibration generated by combustion torque imbalances between the first group of cylinders and the second group of cylinders, and during a second condition with less imbalance vibration, adjusting the first position and the second position to a common position.

16. The system of claim 15 further comprising an underbody resonator upstream of the first exhaust tuning valve and the second exhaust tuning valve, where both the first exhaust passage and the second exhaust passage pass through the underbody resonator.

17. The system of claim 16 wherein the engine is a V-8 engine.

18. The system of claim 17 wherein the engine is a direct injection engine.

* * * * *